United States Patent Office 3,261,872
Patented July 19, 1966

3,261,872
PROCESS FOR EXTRACTING ACID SUBSTANCES SUCH AS PHENOLS, THIOPHENOLS AND/OR THEIR HOMOLOGS FROM NONAQUEOUS MIXTURES CONTAINING THEM
Helmut Fritzsche and Fritz Kroger, Recklinghausen, and Karl Stein, Castrop-Rauxel, Germany, assignors to Firma Carl Still, Westphalia, Germany
No Drawing. Filed July 18, 1961, Ser. No. 126,831
Claims priority, application Germany, Dec. 2, 1960, St 17,186
7 Claims. (Cl. 260—609)

In recovering phenol and its homologs from nonaqueous mixtures which contain them there has been utilized, for example, a methanol-water-extraction, but most often an extraction with an alkaline hydroxide, usually sodium hydroxide, is used. From the phenolate liquor thus produced the phenols are then regenerated by means of acids, e.g. carbonic acid, after removal of the nonphenolic substances. In order to keep the process economically feasible, the sodium bicarbonate solution is then recausticized with caustic lime. A calcium carbonate deposit then remains as a troublesome waste product which can be burned into caustic lime, but usually is discarded. The products thus obtained are often not free of non-phenolic substances, especially hydrocarbons and bases.

In a quest for simple extraction possibilities it has been found that aqueous solutions of some salts have the ability to dissolve phenol and its homologs, so that attempts have been made to utilize such solutions industrially also. In the main, sodium salts have been utilized. Particularly suitable salts appear to be salts of strong alkalis, e.g. sodium, and comparatively weak acids such as acetic acid, boric acid, phosphoric acid, etc. Phenol itself and its homologs have also been suggested as acid components. Such an aqueous phenolate solution which consists of a mixture of phenolate, cresolate and perhaps xylenolate is obtained if in a continuous plant operation the working solution is produced by extracting the fraction (carbolic oil) of a high temperature tar which boils between 180 and 210° C. with sodium hydroxide, so that amounts of alkali which are equivalent to the amounts of phenol and its homolog go over into the solution and a so-called saturated phenolate solution is produced.

The solution thus obtained is a solvent for phenols, and it is adapted to extract phenols from oils industrially. The manufacture of the solution is very convenient because it is formed from the products of the plant operation itself.

If such an aqueous salt solution is combined with oils containing phenol and its homologs, e.g. at 70° C., not only phenol and its homologs go over into the aqeous solvent but at the same time considerable amounts are sometimes dissolved of the components from which the phenols are to be separated, namely neutral oils such as naphthalene, which accompany the phenols in the original oil mixture.

These neutral components may be washed out of the extract by means of selective solvents, e.g. aliphatic hydrocarbons, whereupon, after mechanical separation small amounts of dissolved aliphatic hydrocarbons may be removed by means of a vapor stripping operation, preferably a steam distillation. From the thus pretreated solution the physically dissolved phenols, i.e. that amount of phenol and its homologs which is not tied up by the alkali, is extracted with a suitable solvent, from which the bases and the sulphur compounds may be removed in a known manner, e.g. by acid washing, by selective solvents and/or by oxidation. After separation of the solvent from the phenol mixture, a so-called raw phenol is obtained. The phenolate solution which now contains only equivalent amounts of alkali and phenols, preferably after removing residual amounts of the last-used solvent, is recycled into the phenol extraction process.

It has now been found that the extraction of acidic substances such as phenol, thiophenol and/or their homologs from nonaqueous mixtures which contain them may be advantageously performed with aqueous solutions of the alkali metal salts of benzoic acid, particularly the sodium benzoate, alone or in admixture with other salts of relatively strong bases with relatively weak acids, whereby the aqueous alkali benzoate solution which is enriched with acidic oily substances is freed therefrom by means of a solvent and is subsequently recycled to the extraction process.

It is true that it was not surprising to one skilled in the art that acid components might be extracted from tarry oils with aqueous alkali benzoate solutions, because sodium benzoate, for example, is surely a salt of a strong base and a comparatively weak acid.

It has been surprisingly found however, that aqueous sodium benzoate solutions are able to dissolve much more phenols than equally strong aqueous working solutions of phenols, thiophenols and/or their homologs and alkali, and similarly surprisingly it has been found that fewer nonphenolic substances are dissolved by aqueous sodium benzoate solutions.

Compared to the salts of the aliphatic acids, e.g. acetic acid, benzoic acid has the advantage that sodium benzoate is easily produced in plants which treat tar oil. For manufacturing or supplementing the alkali benzoate solution in an industrial operation, benzonitrile, which is contained in the nonaqueous mixtures to be extracted, is hydrolyzed to benzoic acid by the alkaline-acting aqueous solution during the extraction, and this is transformed into an alkali benzoate, so that the benzonitrile is either present in the mixture to be dephenolated, or else, it can be added thereto in the form of an enriched fraction.

*Example.*—After shaking at 70° C. the results set forth in the following table were obtained:

| | Na-Benzoate solution containing 100 g. NaOH/l. | Na-phenolate solution from the continuous plant operation containing 100 g. NaOH/l. |
|---|---|---|
| Extraction Medium Used, cc | 1,500 | 1,500 |
| Carbolic Oil Containing 36% Acid Oils ($d_{20°}=1.0$), cc | 1,500 | 1,500 |
| Lower Phase, cc | 1,800 | 1,680 |
| Upper Phase, cc | 1,200 | 1,320 |
| Non-phenolic substances in the lower phase, as determined by steam stripping with excess NaOH, cc | 50 | 84 |
| Phenols in the lower phase, g | 237 | 124 |
| Extraction effectiveness in one stage, percent | 44 | 23 |

From this example it may be seen clearly that the use, according to this invention, of aqueous sodium benzoate solutions is considerably more advantageous than that of the aqueous mixed solutions of sodium phenolate, cresolates and perhaps xylenolates which are produced in the continuous plant operation at an early stage of the operation, e.g. carbolic oil is extracted with sodium hydroxide, so that the solution, whose alkali content is completely tied up by phenols, cresols and xylenols, is then used further as solvent for acidic oils in the cycle of operation, for removing the acids from the carbolic oil, washing out the neutral oils, removing residues of the neutral oil solvent, and subsequently extracting the physically dissolved portion of acidic oils with a selective solvent, removing any residues of this solvent that are present, and then reusing the aqueous solvent which now contains stoichiometric amounts of alkali and acid substances for the extraction of acidic oils from oils which contain them.

During this it is advantageous to take care, in a known manner, that from the acid-enriched aqueous alkali benzoate solution the incidentally dissolved non-phenolic substances are extracted by means of aliphatic hydrocarbons, preferably gasoline fractions which are freed of aromatics before phenol-enriched aqueous alkali benzoate solution is regenerated by means of a solvent from the phenols. Because of the lower content of nonphenolic substances it is possible to work with correspondingly smaller amounts of extracting medium than before.

According to a further embodiment of this invention, it is suitable to use as solvent for the extraction of the acidic oil components from the aqueous alkali benzoate solution which contains them, higher branched chain alcohols which boil above 230° C. having up to 20 C-atoms and are identical with products obtained in the oxo-synthesis, either alone or in admixture with substances of the same boiling range, from which the extracted phenols are taken off overhead, if desired by means of a stripping gas. Such alcohols may be utilized as pure compounds or mixtures and can be produced in any known manner.

In this manner it is possible to obtain very pure phenol products. This was not possible with the common solvents such as diisopropylether, which boil at a lower temperature than phenols since in that case the phenol remains in the bottoms with all the high boiling impurities and the solvent must be distilled off overhead in order to be recovered.

The molecular weight of the alcohols which are suitable as solvent, is fairly limited. If it is desired to obtain the phenols by distillation as head products from the alcohols, the boiling point of the solvent must be higher than that of the phenols themselves. The 2,3,4,7-tetramethyl-nonanol-9 having 13 C-atoms (alcohol $a$) boils, e.g., at normal pressure between 245 to 260° C. and thus has approximately the lowest permissible boiling limit, since the phenols which are to be recovered boil up to 225° C.

The upper limit of the molecular weight of the alcohols to be used is determined by the fact that the viscosity and the solidification temperature increase with increasing molecular weight. Because of this the handling and storing at normal temperature become difficult. The alcohol mentioned above has, for example, at 30° C. a viscosity of 3.6° E. while its solidifying point is below −70° C. The 2,2,4,8,10,10 - hexamethyl - 7 - methylolundecane having 18 C-atoms (alcohol $b$) boils at normal pressure between 280 and 310° C. and has at 30° C. a viscosity of 38 E. and a solidifying point of −24° C. Its use is thus only possible at increased temperatures. Alcohols with even higher molecular weights are therefore of very little use. For comparison the normal alcohols may be mentioned. Normal tridecanol has a melting point of −30.6° C. (as against alcohol $a$, below −70° C.) and normal octadecanol of −59° C. (as against alcohol $b$, −24° C.).

Their use for the purpose of phenol removal is thus rendered difficult, if not impossible.

We claim:

1. In the process for recovering a member selected from the group consisting of phenols, thiophenols and mixtures thereof from nonaqueous mixtures by contacting the nonaqueous mixtures with an aqueous salt solution, recovering a solution of said member and the aqueous salt solution and extracting said member from the salt solution with an organic solvent and subsequently separating said member from the organic solvent, the improvement of using as the aqueous salt an alkali metal benzoate in solution sufficiently concentrated so as to dissolve said member at a temperature of substantially 70° C.

2. The process of claim 1, wherein the alkali metal benzoate is sodium benzoate.

3. The process of claim 1, wherein the organic solvent for phenols is a higher aliphatic branch chain alcohol, boiling above 230° C., having up to 20 carbon atoms.

4. The process of claim 3, further characterized in that the alcohols are used in admixture with hydrogenated branch chain oxo products boiling about 230° C., having up to 1 carbon atom.

5. The process of claim 1, wherein the alkali metal benzoate is continuously recovered and recycled to the extraction step.

6. The process of claim 5, wherein the alkali metal benzoate is sodium benzoate.

7. The process of claim 1, further characterized wherein the alkali metal benzoate solution is prepared in situ, by the alkaline hydrolysis of benzonitrile, which is a component of the nonaqueous feed-mixture.

References Cited by the Examiner

UNITED STATES PATENTS

| | | | |
|---|---|---|---|
| 1,929,438 | 10/1933 | McKee | 260—627 |
| 2,595,516 | 5/1952 | Doughty et al. | 260—627 |
| 2,683,752 | 7/1954 | Stanley et al. | 260—627 |
| 2,888,491 | 5/1959 | Herbert et al. | 260—627 |

FOREIGN PATENTS

| | | |
|---|---|---|
| 359,013 | 10/1931 | Great Britain. |
| 517,618 | 2/1940 | Great Britain. |
| 710,137 | 6/1954 | Great Britain. |

OTHER REFERENCES

Wagner et al., "Synthetic Organic Chemistry," page 412 (1 page), pub. by John Wiley & Sons, Inc., New York (1953).

LEON ZITVER, *Primary Examiner.*

CHARLES B. PARKER, *Examiner.*

HAROLD G. MOORE, J. E. EVANS,
*Assistant Examiners.*